A. J. PODMORE.
LAVATORY ATTACHMENT.
APPLICATION FILED JUNE 25, 1908.

981,877.

Patented Jan. 17, 1911.

WITNESSES:
Jas. C. Wolensmith
Howard B. O'Rie

INVENTOR
Arthur J. Podmore,
BY
Mc Coasdal
ATTORNEY.

UNITED STATES PATENT OFFICE.

ARTHUR J. PODMORE, OF CAMDEN, NEW JERSEY, ASSIGNOR OF ONE-HALF TO THOMAS MUNROE DOBBINS, OF PHILADELPHIA, PENNSYLVANIA.

LAVATORY ATTACHMENT.

981,877.     Specification of Letters Patent.     Patented Jan. 17, 1911.

Application filed June 25, 1908. Serial No. 440,241.

*To all whom it may concern:*

Be it known that I, ARTHUR J. PODMORE, a citizen of the United States, residing at Camden, in the county of Camden and State of New Jersey, have invented a new and useful Lavatory Attachment, of which the following is a specification.

My invention relates to lavatory attachments.

My object is to provide improved means for securing a hinged body to a lavatory device, especially to lavatory devices not originally made with suitable provisions for connecting the hinged seat and lid directly thereto. For example, a majority of the water closet bowls as now made, are provided with apertured lugs as a part of the integral portion and structure for receiving the posts which form part of the hinged elements for connecting the seat and lid directly with said bowl. Formerly these bowls were not provided with such lugs but a wooden surrounding structure or other adjacent structure was provided for securing the lid hinges thereto. Since the open plumbing has now become so generally in vogue, such inclosing structures have become more and more unpopular, and these old bowls without means for securing the seats and lids thereto have become difficult to dispose of, and factories having a large stock of these devices on hand are unable to realize on the same. I have found by the employment of a simple device in connection with the means for connecting the water supply that I can equip these closets with the regular stock seats and lids employed with open work plumbing.

Figure 1:
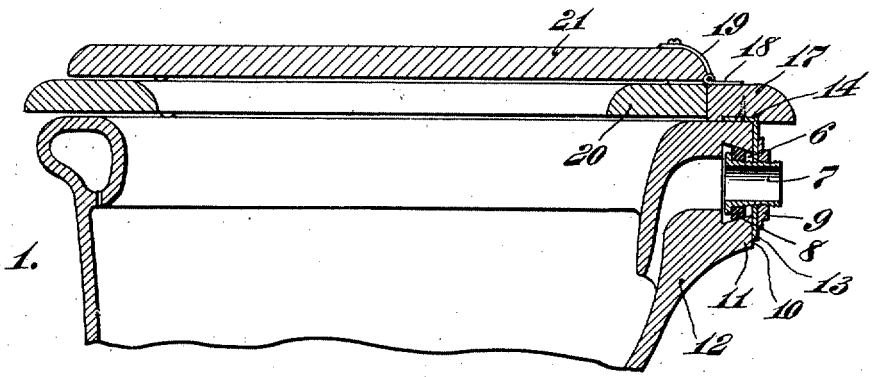
Figure 2:
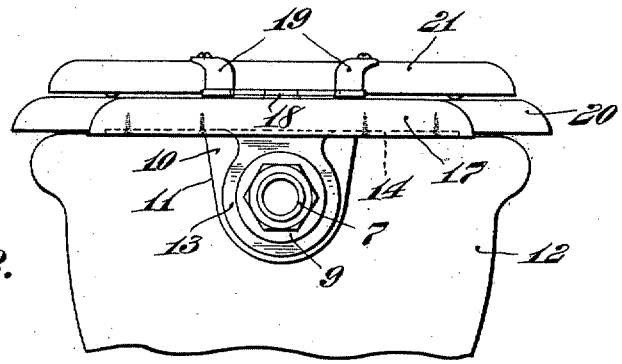
Figure 3:
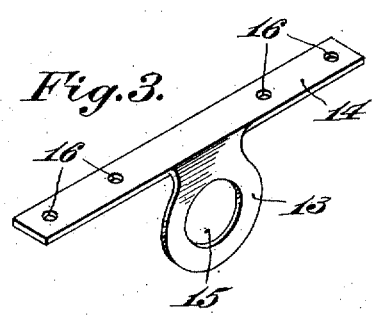
Figure 4:
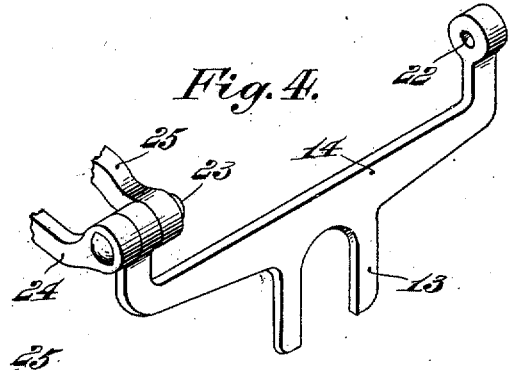
Figure 5:
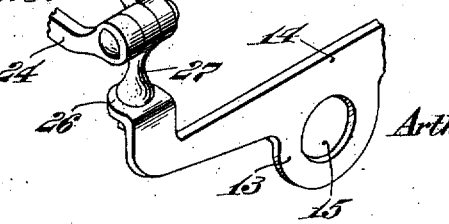

Referring to the drawings:—Figure 1 is a vertical section showing my device and a portion of the bowl of the closet. Fig. 2 is an elevation of same. Fig. 3 is a perspective of one form of attachment member. Fig. 4 is a perspective of another form showing hinge elements connected directly therewith. Fig. 5 is a perspective of a portion of another form with the post and hinge elements connected therewith.

Similar numerals refer to similar parts throughout the several views.

Referring to Fig. 1, the bowl of the closet is provided at its water supply inlet with a tapered recess 6 in which a nozzle or spud 7 is secured by means of a gasket 8 and a nut 9 threaded on said spud 7. This is a common well known structure.

Between the nut 9 and the flat face 10 of the lug 11 of the basin 12 against which face 10 the nut 9 is normally adapted to engage, I insert the lower extension 13 of member 14 as shown in Fig. 4. Or in a structure such as shown in Figs. 3 and 5, I insert the spud through the aperture 15 before threading the nut 6 on said spud. By screwing the nut down tight on the member 14 the same is firmly held in place in any desired position. This member 14 may be provided with a horizontal extension at right angles with the vertical portion 13, provided with the screw holds 16 through which screws are inserted to engage the member 17 to which are secured the hinges 18 and 19 for the seat 20 and lid 21 respectively; this being one form of stock seat and lid.

In Fig. 4, I show the member 14 provided with upwardly extending lugs at either end in which are horizontal apertures 22 for receiving the pin 23 of the hinge elements 24 and 25 of the seat and lid respectively. In Fig. 5, I show the member 14 provided with a horizontal lug 26 at its end in which is a vertical aperture not shown through which is bolted the post 27 connected with the hinge elements 24 and 25 respectively. The form shown in Fig. 5 is adapted to receive the seat and lid with hinge and post connections complete which are already in stock and adapted to engage with the apertured lugs of the modern basin above referred to. It will therefore be evident that the member 14 of the form shown in Fig. 5, will adapt the old form of basin to be equipped, without further mechanism, with the stock seat and lid now in common use. It will also be obvious that the method of connecting this member to the basin is extremely simple, and that the member itself is adapted to be made from a single piece of metal, and is consequently inexpensive. The nozzle, or threaded pipe 7, is commonly known in the trade as a spud, and is referred to in the claims to designate this part, or any analogous means for connecting the water supply with the basin.

It will be noted that gasket 8 which surrounds spud 7 lies against the flange at the inner end of said spud. This gasket 8 lies entirely within the tapered inlet 6. The gasket has a substantial portion of its body extending beyond the periphery of the flange on the spud. This holds the spud well away from the walls of the inlet and permits play between spud and bowl to take up jars and shocks due to the operating of the seat.

It is obvious that this device may be applied to securing a seat or a lid as may be desired. I therefore refer to seat or lid as a body, meaning to include either by this term, and I refer to the water closet basin as a lavatory device, meaning to include any analogous structure.

What I claim is:—

1. In combination with an earthenware lavatory device having a tapered flushing inlet, a spud connected therewith, a gasket between the spud and the walls of the tapered inlet, a nut threaded on the spud, a member interposed between the nut and the lavatory device and held in place by said nut and a body having a hinged relation with said member.

2. In combination with a water closet bowl of earthenware or the like, having a tapered flushing inlet, a spud connected therewith, a gasket between the spud and the walls of the tapered inlet, a nut threaded on said spud outside the tapered inlet, a member secured by said nut and a body having a hinged relation with said member.

3. In combination with a water closet bowl of earthern ware or the like, having a tapered flushing inlet, a longitudinally movable spud inserted therein, a gasket between the spud and the walls of the tapered inlet, a covering for the bowl, a member, connected with the covering, interposed between the outer end of the tapered inlet and the outer end of the spud, and means for forcing said member inwardly toward the outer end of the tapered inlet, and for moving the spud outwardly to cause the gasket to engage the tapered sides of the inlet.

4. In combination with a water closet bowl of earthenware or the like, having a tapered flushing inlet, a longitudinally movable spud having a flange at its inner end, inserted in said inlet, a gasket between the spud and the tapered walls of the inlet and between the flange and the outer end of said inlet, a nut threaded on the spud, a covering for the bowl, and a member, connected with said covering, interposed between the outer end of the inlet and the nut.

5. In combination with a water closet bowl of earthenware or the like, having an annular tapered recess within its flushing inlet, a longitudinally movable spud, having a flange at its inner end, extending into said recess, a gasket encircling the spud between the flange and the outer end of the tapered recess and interposed between said spud and the walls of said recess, a member, between the outer end of the spud and the outer end of the tapered recess, having an aperture to accommodate said spud, a seat or lid connected with said apertured member, and a clamping nut threaded on the spud outside said member.

6. In combination with a water closet bowl of earthenware or the like, having an annular tapered recess within its flushing inlet, said recess provided at its inner end with an inwardly extending shoulder, a longitudinally movable threaded spud, having a flange at its inner end, extending into said recess, a gasket encircling the spud between the flange and the mouth of the tapered recess and interposed between said spud and the walls of said recess, a member between the outer end of the spud and the mouth of the tapered recess, having an aperture to accommodate said spud, a covering for the bowl connected with said apertured member, and a clamping nut threaded on the spud outside said member.

7. In combination with a water closet bowl of earthenware or the like having a hinged covering and an outwardly tapering flushing inlet, a flanged spud and a nut threaded thereon, a member, connected with the covering, supported by the spud outside the bowl and held in place by the nut, and a gasket surrounding the spud adjacent its flange and entirely within the tapered inlet, and having a substantial body extending beyond the periphery of the flange to maintain the spud well away from the walls of the tapered inlet and to permit play between the spud and the bowl.

ARTHUR J. PODMORE.

Witnesses:
MAE HOFMANN.
HOWARD S. OKIE.